V. R. BRUCE & R. G. DICKENS.
CLUTCH.
APPLICATION FILED FEB. 9, 1918.
1,275,213.
Patented Aug. 13, 1918.
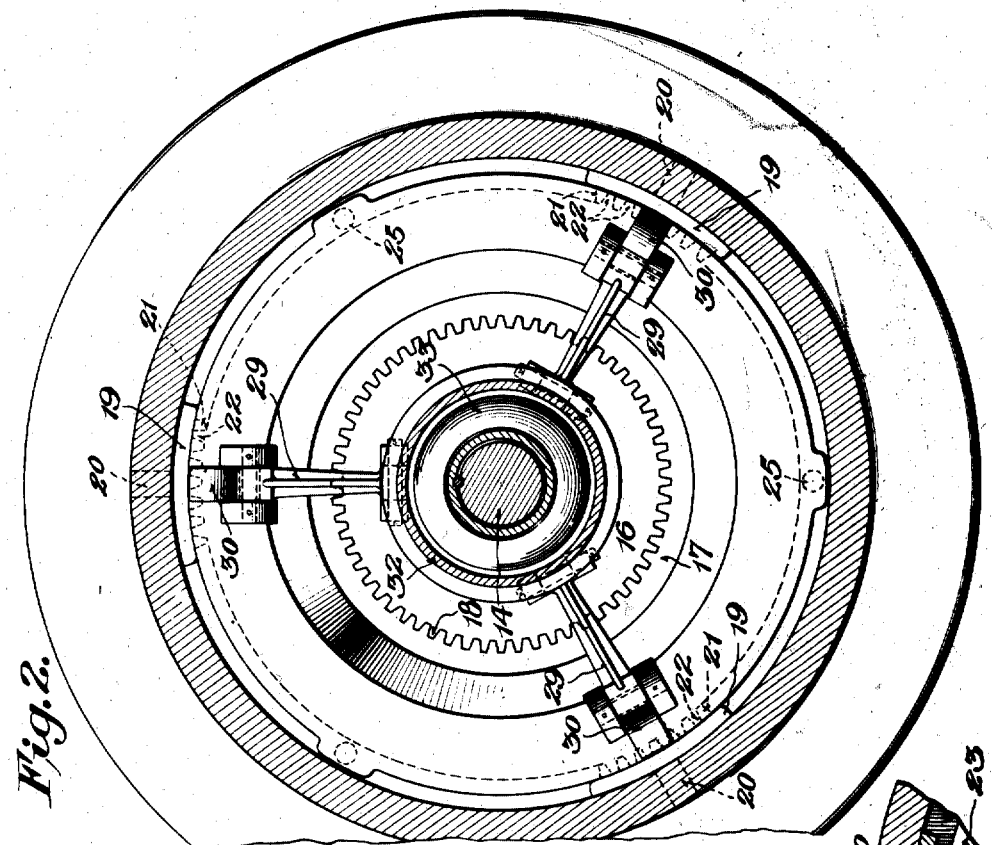
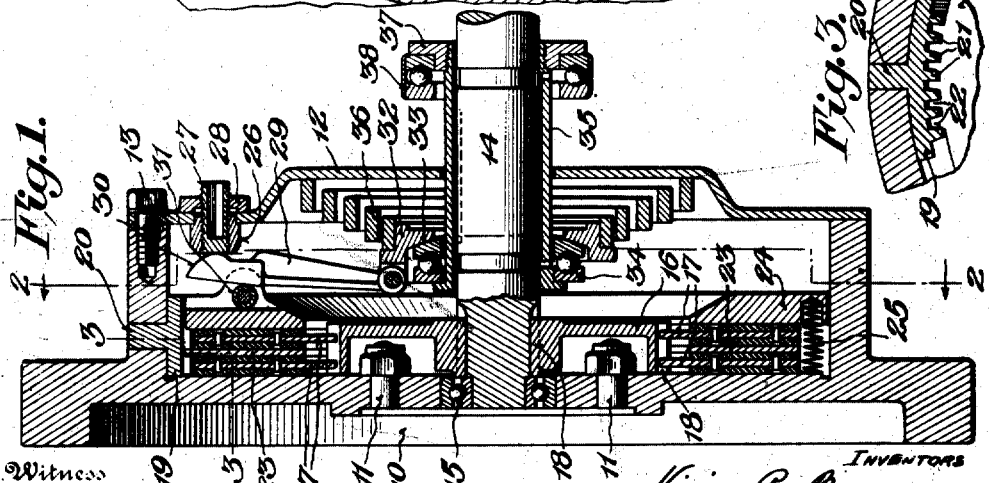

UNITED STATES PATENT OFFICE.

VIVIAN R. BRUCE AND RICHARD G. DICKENS, OF ELMIRA, NEW YORK, ASSIGNORS TO HILLIARD CLUTCH AND MACHINERY COMPANY, OF ELMIRA, NEW YORK, A CORPORATION OF NEW YORK.

CLUTCH.

1,275,213.  Specification of Letters Patent.  Patented Aug. 13, 1918.

Application filed February 9, 1918. Serial No. 216,216.

*To all whom it may concern:*

Be it known that we, VIVIAN R. BRUCE and RICHARD G. DICKENS, citizens of the United States, and residents of Elmira, county of Chemung, and State of New York, have invented a new and useful Improvement in Clutches, of which the following is a specification.

This invention relates to friction clutches and more particularly to clutches adapted for use on motor vehicles.

One of the objects of the invention is to provide an improved form of actuating mechanism that will be readily adjustable and will be uniform in its action, although of extremely simple construction.

Other objects and the features of novelty will be apparent from the following description, taken in connection with the accompanying drawings, of which Figure 1 is a longitudinal section of a clutch embodying the invention; and Fig. 2 is a transverse section on the line 2—2 of Fig. 1.

Fig. 3 is a detail section on the line 3—3 of Fig. 1.

Referring to the drawings, 10 indicates a casing in the form of a fly-wheel which may be secured to the crank shaft of an engine by suitable bolts which are indicated at 11. The open side of the casing 10 is closed by means of a plate 12 which is secured to the casing by bolts 13. A shaft 14 has one end supported in a bearing 15, in the casing 10, and carries a spider 16 on which the friction disks 17 are mounted, the friction disks and spider 16 being provided with intermeshing teeth 18.

A plurality of short segments 19 having outwardly projecting cylindrical lugs 20, are arranged on the interior of the casing 10, the lugs 20 projecting through suitable openings in the walls of the casing, as clearly shown in Figs. 1 and 3. The lugs 20 serve to form a driving connection between the segments 19 and the casing and also constitute a very simple and easily assembled construction. The segments 19 are provided with teeth 21 with which teeth 22 on the friction disk 23 mesh, this friction disk being thereby driven by the casing 10. A pressure plate 24 is also provided with teeth similar to the teeth 22, which mesh with the teeth 21 of the segments 19.

A plurality of springs 25 are arranged between the pressure plate 24 and the web of the casing 10 and act to press the pressure plate away from the friction disks.

The plate 12 has secured on its inner side screw-threaded sleeves 26, which carry the adjustable set screws 27. The set screws 27 are secured in any position to which they may be adjusted, by means of the lock nuts 28. In the construction illustrated, there will be three of the set screws 27 equally spaced and having in coöperation therewith the actuating levers 29. The levers 29 are radially arranged and have cam shaped outer ends 30 which bear upon the set screws 27, an intermediate portion of each of the levers, bearing on a roller 31, on the pressure plate 24. The inner ends of the levers 29 are pivotally connected with a ring 32, which has a ball and socket, or universal connection 33 with a thrust bearing 34 on the axially adjustable sleeve 35. A spring 36 is arranged between the plate 12 and the ring 32 and normally serves to actuate the levers 29 so as to compress the friction disks together and form a driving connection between the casing 10 and the shaft 14. The sleeve 35 carries a collar 37 on which a thrust bearing 38 is arranged, this thrust bearing being connected with any of the usual forms of actuating mechanism or hand levers.

As above stated, the spring 36 normally compresses the friction disks together but when it is desired to relieve the pressure on the friction disks the sleeve 35 is moved toward the right in Fig. 1 and the springs 25 then act to move the pressure plate 24 away from the friction disks.

Any wear in the friction disks may be readily compensated for by adjustment of the set screws 27 and in view of the ball and socket joint 33, the ring 32 will automatically be adjusted to take care of any inequalities in the adjustment of the set screws 27. It is, therefore, unnecessary to exercise extreme care in the adjustment of the set screws 27 and for this reason the maintenance of the clutch in perfect running condition is a simple matter.

While we have illustrated and described what we now consider to be the preferred form of our invention, it will be understood that various modifications may be made without departing from the spirit of the invention as set forth in the appended claims.

Having described the invention what is claimed is:—

1. In a friction clutch, the combination of coaxially arranged driving and driven members, a series of friction disks whereby one of said members may drive the other, a pressure plate associated with said disks, a plurality of adjustable elements carried by one of said members, a plurality of substantially radially arranged levers, each coöperating with said pressure plate and one of said adjustable elements, a ring to which the inner ends of said levers are connected and an axially shiftable member having a ball and socket connection with said ring and adapted to actuate said ring to release said disks.

2. In a friction clutch, the combination of coaxially arranged driving and driven members, a series of friction disks whereby one of said members may drive the other, a pressure plate associated with said disks, a plurality of adjustable elements carried by one of said members, a plurality of substantially radially arranged levers, each coöperating with said pressure plate and one of said adjustable elements, a ring to which the inner ends of said levers are connected, a spring coöperating with said ring to compress said disks together, and an axially shiftable member having a ball and socket connection with said ring and whereby the pressure of said spring may be overcome.

In testimony whereof we affix our signatures.

VIVIAN R. BRUCE.
RICHARD G. DICKENS.